(No Model.) 2 Sheets—Sheet 1.
S. C. C. CURRIE.
REGULATION OF ALTERNATE CURRENT GENERATORS.
No. 423,029. Patented Mar. 11, 1890.
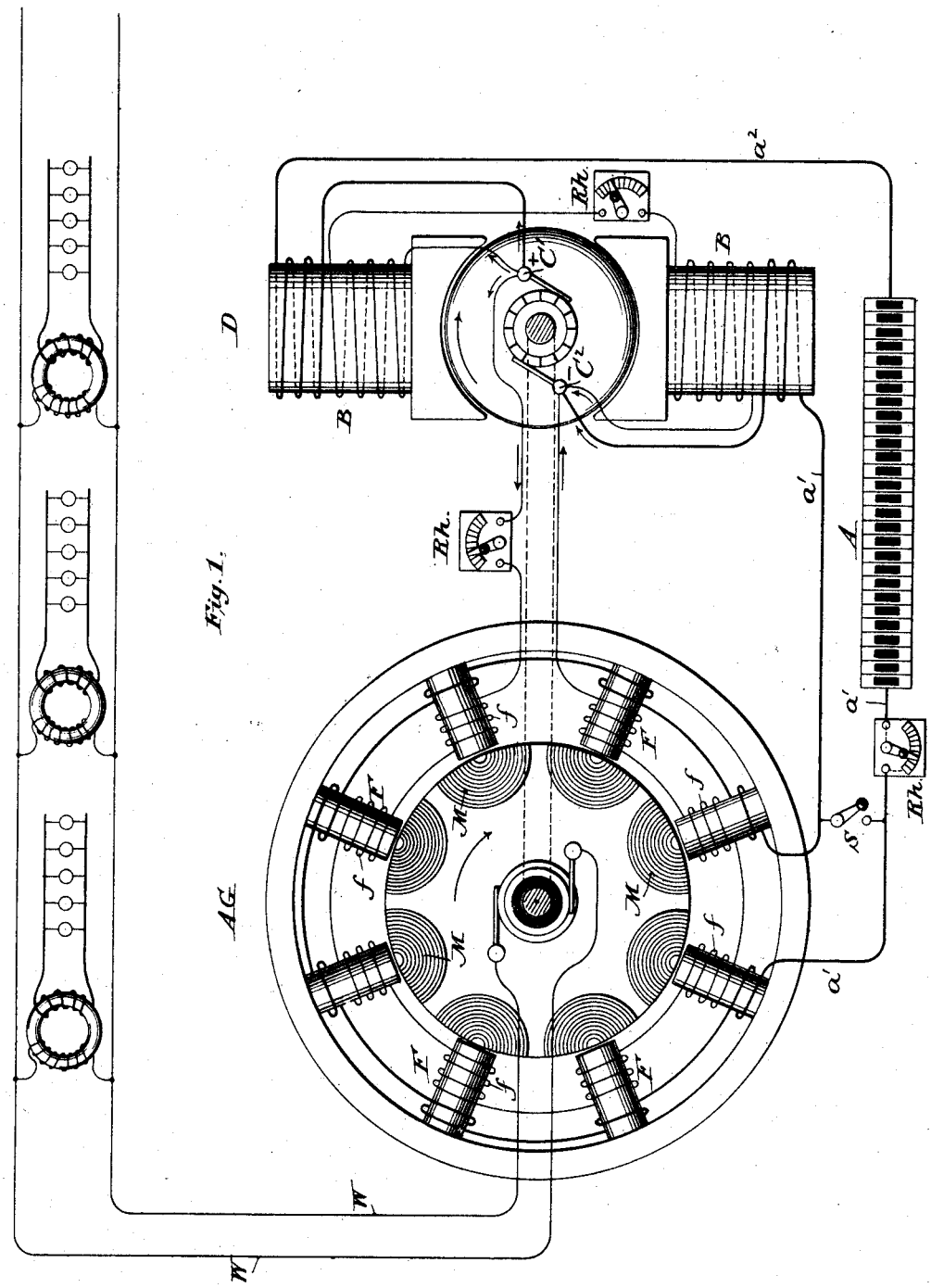
Witnesses
N. H. Smith
C. W. Brooker
Inventor
Stanley C. C. Currie
By his Attorneys
Baldwin Davidson & Wight

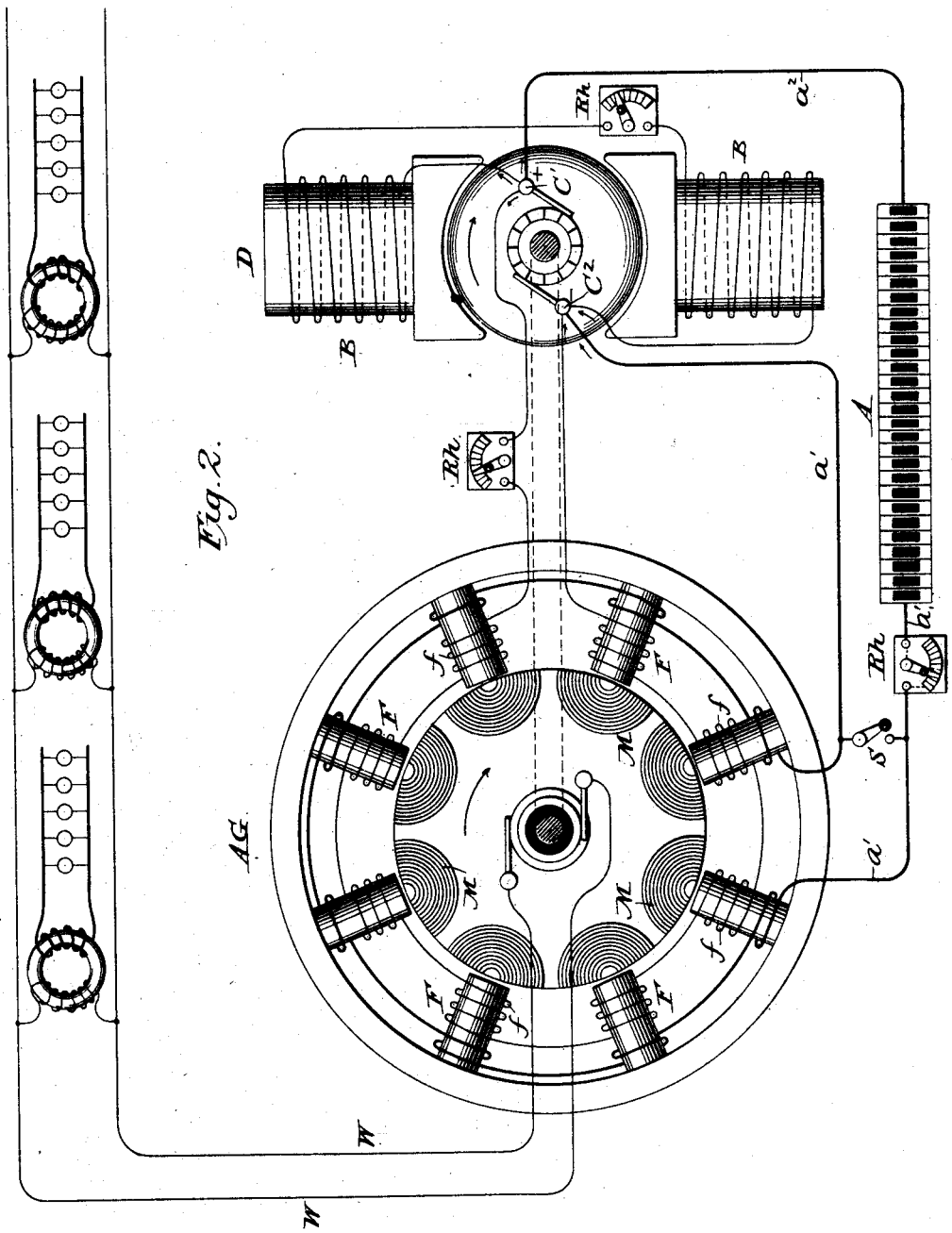

UNITED STATES PATENT OFFICE.

STANLEY C. C. CURRIE, OF PHILADELPHIA, PENNSYLVANIA, ASSIGNOR TO THE UNITED ELECTRIC IMPROVEMENT COMPANY, OF GLOUCESTER CITY, NEW JERSEY.

REGULATION OF ALTERNATE-CURRENT GENERATORS.

SPECIFICATION forming part of Letters Patent No. 423,029, dated March 11, 1890.

Application filed December 5, 1889. Serial No. 332,683. (No model.)

*To all whom it may concern:*

Be it known that I, STANLEY C. C. CURRIE, of Philadelphia, in the county of Philadelphia and State of Pennsylvania, have invented certain new and useful Improvements in the Regulation of Alternating Generators, of which the following is a specification.

The object of the invention is to provide means whereby in the case of an alternating-current dynamo supplying lamps or other translating devices, either through a transformer or otherwise, the mechanical load upon the prime motor—for instance, the steam-engine driving the dynamo—may be kept practically constant, notwithstanding the fact that the load upon the dynamo is variable, depending, as it does, upon the number of translating devices in use. In electric-light systems the load upon the dynamo, and consequently upon the engine, is a varying one. This fact, coupled with the necessity of having the engine and boiler power (except in the case of a direct-storage system) sufficient to carry the maximum load, causes of necessity a very much larger consumption of coal than would be the case were it possible to run the engine with a constant mean load.

Where direct-current machines supply lamps, the load upon the engine can be maintained practically constant by use of storage-batteries as regulators, such batteries being of sufficient capacity to meet the maximum variation and placed in parallel with the dynamo and lamp-circuit. Where alternating-current machines are used, however, the storage-batteries cannot be charged, and consequently the system just mentioned cannot be used.

By using storage-batteries in combination with an alternating-current machine the load upon the engine can be maintained at a constant, and in the event of the engine breaking down current will still be supplied to the system by means of the storage-battery.

My invention will be understood from the following specification and accompanying drawings, which latter illustrate diagrammatically two ways of embodying or carrying out my idea.

Figures 1 and 2 are similar diagram views illustrating organizations differing somewhat in detail.

A G represent any suitable alternating electric generator, and D a direct-current exciter therefor mounted upon the same shaft.

F F are the field-magnets of the alternating generator, which are excited by the direct current from the exciter D through the coils $f$.

M M represent the coils of the revolving armature of the alternating generator, from which wires W run to a distribution-circuit. In the present instance transformers are shown connected in multiple between the leads of the generator in the usual manner. The exciter D is of larger dimensions and greater power than would be required merely for the usual excitation of the field-magnets F F, and is so made for a purpose presently described.

A A represent a storage-battery of a size and capacity adapted to the circumstances. Any other form of alternating generator may of course be used, that illustrated being selected merely for the purpose of illustration.

The exciting-coils $f$ of the field-magnets F of the alternating generator are connected in a circuit between the + and − terminals $C'$ $C^2$ of the exciter D, and are of comparatively fine wire.

The field-magnets B of the exciter are shunt wound with relatively fine wire, as shown in the drawings. In Fig. 1 these field-magnets are also compound wound, as I will now describe.

Thick wires $a'$ $a^2$ are lead from the terminals of the storage-battery A, the circuit being completed in the following manner: The wire $a'$ passes around each of the field-magnet poles F of the alternating generator, being wound successively upon said poles in alternate directions, the same as the exciting-coils $f$, and then passes around one field of the exciter D to the brush $C^2$, thence through brush $C'$ around the other field of the exciter, and from thence the wire $a^2$ leads to the other terminal of the storage-battery A.

Of course the size of the wires $a'$ $a^2$, the number of turns around the field-magnets $F'$ and around the field-magnets of the exciter D, as well as the direction of the winding, must be in accordance with the special requirements of each case and the objects to be attained, which are as follows: Suppose the load in the dynamo is one-half its total capacity, or, in other words, that half the total number of lamps are lighted, and also assume that this condition represents the mean load. The number of cells in the storage-battery should be so regulated that in this case the electro-motive force of the exciter balances that of the battery, and no current flows therefore in the circuit $a'$ $a^2$.

Suppose now that the lamp-load falls below the mean. Then, the load on the engine being lighter, the electro-motive force of the exciter D will rise, and if the winding of the circuit $a'$ $a^2$ be properly arranged a current will pass from the exciter to the battery A, which will be charged thereby. The speed of the engine being now slightly increased, the effect of the coarse-wire coils around the field-magnets F will in this instance tend to neutralize the effect of the smaller coils, and thus lower the magnetic intensity. On the other hand, suppose the lamp-load is greater than usual, the tendency of the engine will be to slow down, and the battery A will discharge through the circuit $a'$ $a^2$ and increase the magnetic intensity of the field-magnets $F'$, as well as the magnetic intensity of the exciter D, which will now run as a motor and assist the engine in driving the shaft of the alternating generator.

By properly proportioning the size and number of windings of the field-coils the variation in load can be proportionally compensated for by the variation of field intensity; also, by properly proportioning the capacity and size of the battery and of the exciter D the current discharge of the former into the latter could be made to take the maximum load in the event of a breakdown of the engine.

In Fig. 2 the organization is the same, with the exception that the wires $a'$ $a^2$ run direct to the brushes of the exciter. The operation is practically the same as that above described.

A switch S (shown in both figures) may be employed to short-circuit the wires $a'$ $a^2$ around the coils F, in which case the variation of field excitation will be within smaller limits.

Various modifications can of course be made by those skilled in this art, according to the requirements in particular cases—that is to say, the direction of winding of the circuit $a'$ $a^2$ on the field-magnets F or the field-magnets of the exciter, or both, may be reversed from that illustrated and described. This, however, of course depends upon whether it is desired to maintain a constant speed for the engine, and consequently a constant number of alternations, or whether the electro-motive force of the distribution-circuit W is to be maintained at a constant and the current be variable, or the current constant and the electro-motive force variable.

I have shown rheostats R$h$ both in the exciting-circuit from the dynamo D to the field-coils of the alternating generator in the circuit $a'$ $a^2$ and in the shunt field-coil circuit of the exciter D, by which the circuit conditions may be varied. The electro-motive force of the exciter D may thus be raised or lowered, according to whether the battery is to be charged or not.

The arrangement shown in Fig. 2 is more especially applicable to an alternating distribution system in which a variable potential and constant current are required. The rheostat in the field-circuit of the exciter may be manipulated manually or otherwise, as is perfectly well understood, so that when the lamp-load is light the electro-motive force of the exciter may be raised and current passed through $a'$ $a^2$, such current acting against the current in the exciting-coils $f$ and tending to reduce the magnetic intensity of the field of the generator. By this means the speed of the engine can be maintained at a constant.

In all cases the primary object is to run the exciter as a dynamo to charge the storage-battery and excite the field-magnets F F of the generator when the lamp-load is light, and when the lamp-load is heavy the discharge from the storage-battery runs the exciter as a motor, which drives or assists in driving the shaft of the alternating generator.

I claim as my invention—

1. The combination, with an alternating generator and a constant-current exciter mounted upon or connected with the same shaft, of a storage-battery included in a circuit with the exciter, for the purpose set forth.

2. The combination, substantially as set forth, of an alternating generator, a constant-current exciter mounted upon or connected with the same shaft, a storage-battery, and a circuit including the exciter and storage-battery and field-coils of the alternating generator.

3. The combination, substantially as set forth, of an alternating generator and its exciter, a distribution-circuit W, leading from the alternating generator, and a storage-battery connected in circuit with the exciter, and circuit-connections whereby when the lamp-load is light the exciter is run as a dynamo to charge the storage-battery and when the load is heavy the discharge from the storage-battery drives or assists in driving the shaft of the generator.

4. The combination, substantially as set forth, of an alternating generator, an exciter mounted upon or connected with the same shaft, a storage-battery, and a circuit including the storage-battery, the field-coils of the alternating generator, and the field-coils of the exciter, for the purposes described.

In testimony whereof I have hereunto subscribed my name.

STANLEY C. C. CURRIE.

Witnesses:
MORRIS R. BOCKIUS,
EDWARD C. DAVIDSON.